United States Patent [19]

Schmidt

[11] Patent Number: 5,074,177

[45] Date of Patent: Dec. 24, 1991

[54] MACHINE TOOL WITH AUTOMATIC WORKPIECE CLAMPING DEVICE

[75] Inventor: Manfred Schmidt, Ostfildern, Fed. Rep. of Germany

[73] Assignee: Georg Karstens Fabrik für Messgeräte und Spezialmaschinen GmbH, Ostfildern, Fed. Rep. of Germany

[21] Appl. No.: 510,094

[22] Filed: Apr. 17, 1990

[30] Foreign Application Priority Data

Apr. 19, 1989 [DE] Fed. Rep. of Germany ....... 3912786

[51] Int. Cl.⁵ ............................................. B23B 25/00
[52] U.S. Cl. ....................................... 82/165; 82/166; 82/168; 82/169; 82/170
[58] Field of Search ................ 82/165, 166, 167, 170, 82/168, 169

[56] References Cited

U.S. PATENT DOCUMENTS

| | | | |
|---|---|---|---|
| 3,344,695 | 10/1967 | Hohwart | 82/165 |
| 4,215,605 | 8/1980 | Toth et al. | 82/165 |
| 4,811,639 | 3/1989 | Gress et al. | 82/169 |

Primary Examiner—Bruce M. Kisliuk
Assistant Examiner—Lawrence Cruz
Attorney, Agent, or Firm—Peter K. Kontler

[57] ABSTRACT

A machine tool has a pair of rotary spindles which support opposite ends of a workpiece to be machined. At least one of the spindles is driven and a ring having a plurality of arms is coaxially secured to this spindle for rotation therewith. The arms entrain an annular member which is essentially coaxial with the spindles and is provided with threads. An annular guide plate which is again essentially coaxial with the spindles supports a plurality of clamping jaws for movement radially of the spindles. The clamping jaws are provided with threads which mesh with the threads of the annular member so that rotation of the latter can cause movement of the clamping jaws. A plurality of rocker arms is mounted on the machine tool for pivotal movement between an inoperative position and an operative position in which the rocker arms engage the periphery of the guide plate to prevent rotation thereof. When the guide plate is held by the rocker arms and the driven spindle is rotated, the ring compels the annular member to rotate and thereby move the clamping jaws. Depending upon the direction of rotation, the clamping jaws move into or out of engagement with the workpiece. Upon clamping of the workpiece, the arresting members automatically release the guide plate when the workpiece is gripped with sufficient force. On the other hand, when the workpiece is to be removed, the drive for the driven spindle is automatically shut off once the clamping jaws have opened to a predetermined extent.

31 Claims, 2 Drawing Sheets

MACHINE TOOL WITH AUTOMATIC WORKPIECE CLAMPING DEVICE

BACKGROUND OF THE INVENTION

The invention relates generally to a machine tool.

More particularly, the invention relates to a machine tool such as a rotary grinder, a lathe or the like in which a workpiece to be treated undergoes rotation.

A machine tool of this type may have a pair of spindles which rotatably support the workpiece, and a clamping device which grips one end of the workpiece. At least one of the spindles is driven and the clamping device is coupled to this spindle for rotation therewith by means of one or more entraining elements. The clamping device includes at least two clamping jaws which are mounted for movement in a guide plate and can releasably engage the end of the workpiece, and the clamping jaws are symmetrically displaceable relative to one another via square threads.

The clamping device resembles an annular jaw chuck and a conventional device of this type is constructed using spirally extending square threads. In such a conventional clamping device, two symmetrical discs having respective square threads are rotatably mounted on either side of a guide plate and can be rotated by means of a tightening key. This clamping device can only be tightened and loosened manually. The tightening key, which is inserted in the chuck transversely, can cause damage if it is not removed.

A similar device is disclosed in the West German Publication No. 35 32 942. Here, the clamping device must be set in a very specific angular position by means of a screwdriver in order to tighten and loosen the same. This requires time-consuming control. Moreover, the clamping device has a relatively expensive and bulky structure.

SUMMARY OF THE INVENTION

It is an object of the invention to provide a machine tool which allows a workpiece to be clamped and released without special tools.

Another object of the invention is to provide a machine tool having a relatively simple clamping device for workpieces.

An additional object of the invention is to provide a machine tool having a clamping device which, although relatively simple, makes it possible to reliably clamp and release a workpiece without special tools.

The preceding objects, as well as others which will become apparent as the description proceeds, are achieved by the invention.

The invention resides in a machine tool such as, for example, a rotary grinder, a lathe or the like. The machine tool comprises a driven rotary member, e.g., a spindle, for supporting a workpiece to be treated, and means for releasably clamping the workpiece. The clamping means includes a rotary clamping unit having a plurality of clamping members or jaws and a guide supporting the clamping members for relative movement between a clamping position and a released position. The guide may, for instance, be in the form of a plate. The clamping means further includes an actuating member rotatable with the rotary member, an arresting unit comprising an arresting member movable between an inoperative condition and an operative condition in which the arresting member engages the clamping unit, and means coupling the actuating member to the clamping unit. The coupling means is designed such that the actuating member can move at least one of the clamping members, and preferably all of the clamping members, when the arresting member is in the operative condition.

The machine tool may have a second rotary member or spindle for supporting the workpiece. The two rotary members may engage opposite longitudinal ends of the workpiece thereby allowing the latter to be rotated on its axis.

The actuating member preferably comprises a disc. Such disc may be substantially coaxial with the rotary members.

The clamping members may be movable radially of the rotary members and it is preferred for the clamping members to be movable substantially symmetrically relative to one another. The clamping members may be arranged to grip the workpiece at one end thereof.

The coupling means may include cooperating coupling elements on the clamping unit and the actuating member. The coupling element or elements of the clamping unit are preferably provided on the clamping members. The cooperating coupling elements may be constituted by meshing threads on the clamping unit and the actuating member, and these threads may take the form of square threads.

The machine tool of the invention may include more than one arresting member and each arresting member is independent of the rotation of the driven rotary member. To this end, the arresting member or members may be affixed to a stationary part of the machine tool. This arrangement of the arresting member or members allows the rotary drive for the workpiece to be directly utilized for tightening and loosening of the clamping means so that tightening and loosening can be performed automatically. During automatic tightening and loosening, no special drive is required for displacement of the clamping members and it is also unnecessary to place the clamping means in a predetermined angular position. The machine tool can accordingly be relatively lightweight and compact, particularly as regards length.

The guide for the clamping members and the actuating member which carries a portion of the coupling means may be mounted for rotation relative to one another on the common rotational axis of the rotary members and the workpiece. In this manner, long-lasting concentric rotation about the rotational axis with a symmetrical mass distribution, and hence quiet running of the clamping means with optimally little imbalance, can be achieved simply.

The clamping means may further include a carrier which is rotatable with the driven rotary member and is provided with an entraining element. The entraining element is connected to the actuating member to thereby compel the latter to rotate with the driven rotary member. The guide for the clamping members can be supported on the entraining element with radial play and so that the rotational axis of the guide is at least approximately coincident with the rotational axis of the driven rotary member. Such mounting of the guide permits workpiece exchange, which is preferably carried out automatically, to proceed smoothly. If a workpiece is inserted somewhat off-center, the clamping means containing the guide and the actuating member can then yield to a degree and it is not absolutely necessary to open the clamping members wide. The time for clamping and releasing a workpiece can accordingly be kept optimally short to increase productivity. It is preferred for the carrier to have three entraining elements which are connected to the actuating member and for the guide to be supported by each of the three entraining elements. The carrier may have an annular or ring-like configuration.

Since the rotary drive for the workpiece can generate a large torque, especially at low rpm, it is necessary to limit the tightening moment upon movement of the clamping members to the clamping position. This can be achieved particularly advantageously in that the arresting member or members are directly operated or controlled by a torque limiting device. The arresting member or members are then retracted, i.e., moved to their inoperative conditions, and the guide released when the torque exceeds a preselected value. To this end, a selected arresting member can be shiftable against the action of a resilient member, e.g., a spring, in circumferential direction of the rotary members and can cooperate with a detecting element such as a switch or sensor which causes all of the arresting members to move to their inoperative conditions when the torque reaches the preselected value.

For structural simplicity, the arresting member or members can be constructed as rocker arms or levers which are pivotally mounted on bolts or shafts extending generally in the circumferential direction of the rotary members. Either the shaft of the selected arresting member or the selected arresting member itself can be mounted so as to be shiftable relative to the switch or sensor against the action of the resilient member. The arresting members can be moved between their inoperative and operative conditions by drives in the form of lifting magnets, drive cylinders or any other known moving devices. The arresting members can be movably disposed in slots which extend radially of the rotary members and such slots are preferably provided in an annular support or carrier ring.

A pulse counter can be provided to effect controlled release of the clamping force on the workpiece. The pulse counter can be designed to measure the displacement of the clamping members relative to the coupling element or elements of the actuating member. Alternatively, the pulse counter can be designed to measure movement of the actuating member relative to the guide which carries the clamping members. Shifting of the clamping members away from the clamping position can then be stopped when the actuating member has undergone a specified angular displacement. This allows the clamping and loosening times to be optimized taking into account the tolerances in the diameter of the workpiece. When workpieces of different diameter are processed in succession, the differing workpiece diameters which must be accepted by the clamping means can, if necessary, be taken into consideration using EDV control.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments when read in conjunction with the accompanying drawings.

DESCRIPTION OF THE PREFERRED EMBODIMENTS

Figure 1:
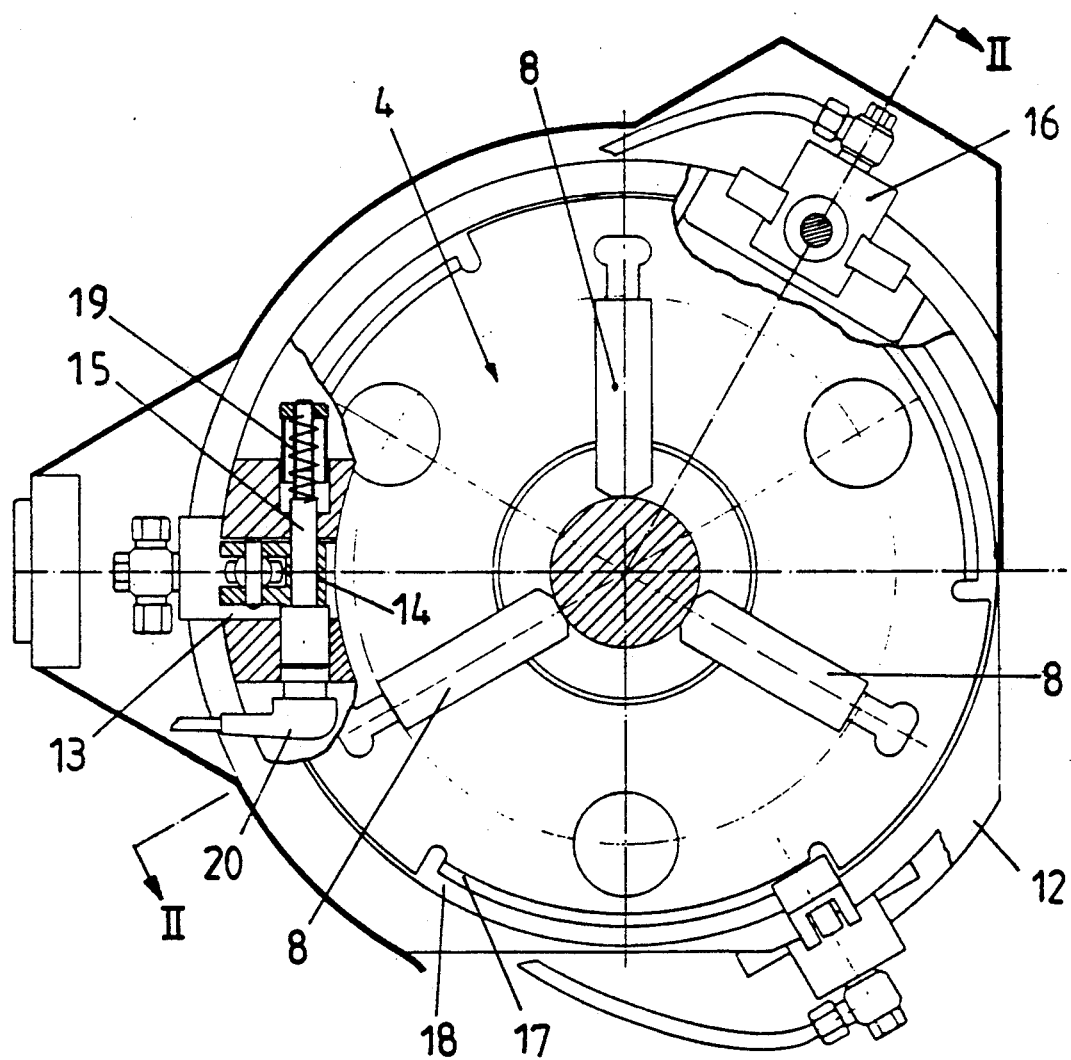
FIG. 1 is a partly sectional elevational view of a rotary machine tool in accordance with the invention as seen facing a jaw chuck of the machine tool.
Figure 2:
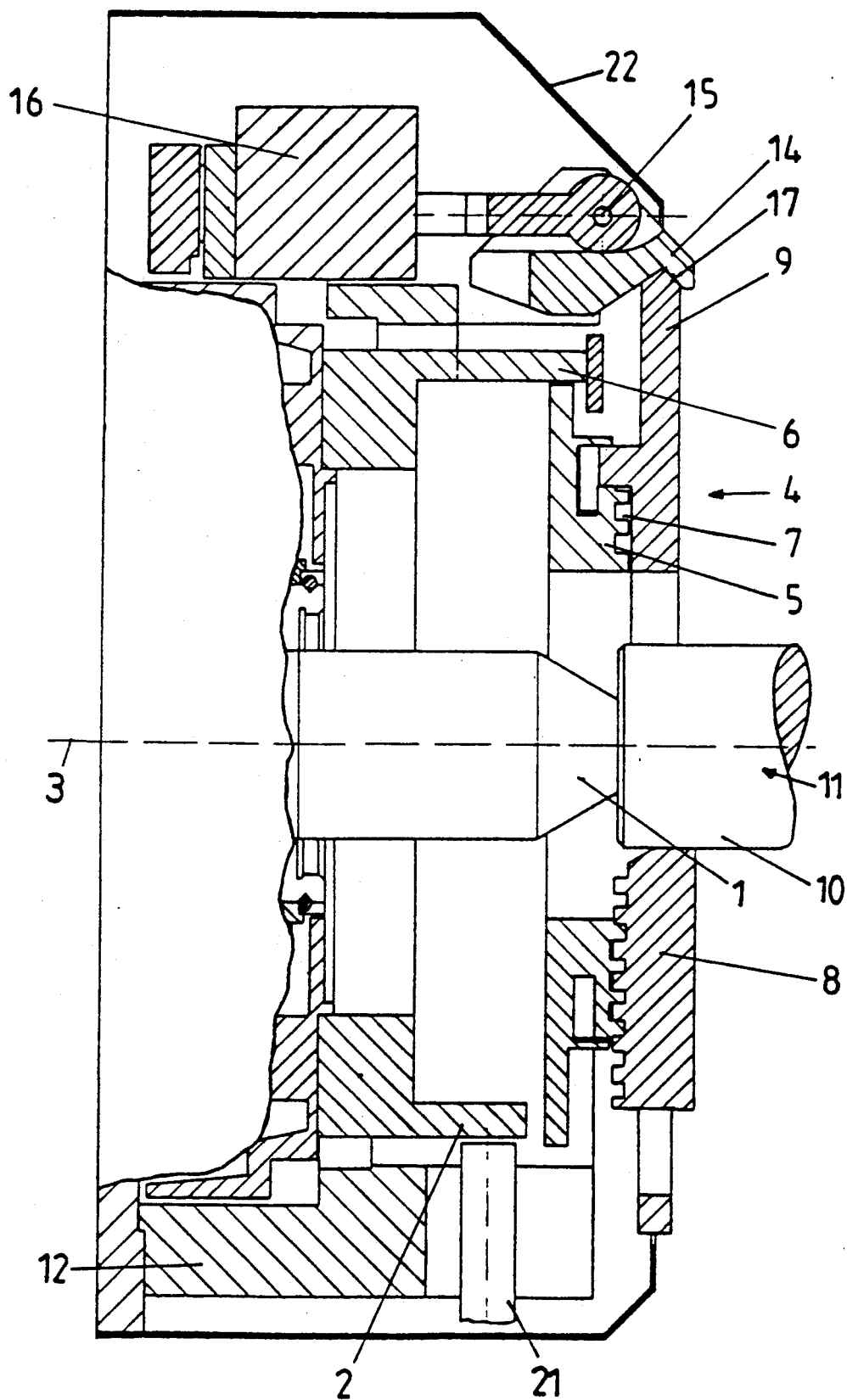
FIG. 2 is an enlarged sectional view along the line II—II of FIG. 1.

FIGS. 1 and 2 show a rotary machine tool according to the invention. This machine tool may, for example, be constituted by a rotary grinder or a lathe. The machine tool includes a non-illustrated headstock which carries a spindle or rotary member 1. The headstock is driven by a rotary drive which causes the spindle 1 to rotate on a rotational axis 3 coinciding with the longitudinal axis of the spindle 1. The spindle 1 supports one longitudinal end 10 of an elongated workpiece 11 having a longitudinal axis which coincides with the rotational axis 3. The second longitudinal end of the workpiece 11 is supported by a second spindle which is coaxial with the spindle 1 and the workpiece 11. The spindle 1 and the second spindle support the workpiece 11 for rotation on the rotational axis 3.

A carrier ring or annular support 2, which is preferably fast with the spindle 1, is rotatable on the rotational axis 3 synchronously with the spindle 1. The carrier ring 2 carries a clamping device 4 which is rotationally symmetrical with respect to the rotational axis 3. The carrier ring 2 and clamping device 4 together constitute a clamping mechanism or means.

The device 4 includes a follower disc or actuating member 5 which is supported with some radial and axial play by three entraining arms or elements 6 constituting part of the carrier ring 2. The follower disc 5 is provided with a square thread or coupling element which meshes with complementary square threads or coupling elements on three clamping jaws or members 8. The clamping jaws 8 are mounted on an annular guide plate 9 for movement in radial direction of the spindle 1 and can be shifted radially, through the agency of the meshing threads, in response to rotation of the follower disc 5. The guide plate 9 and clamping jaws 8 together constitute a clamping unit while the meshing threads constitute a coupling mechanism or means 7 which functions to couple the follower disc 5 to the clamping unit 8,9. The follower disc 5 and the guide plate 9 are coaxial with the spindle 1 and are rotatable with respect to one another on the rotational axis 3.

The three clamping jaws 8 grip the end 10 of the workpiece 11 so that the latter is fixed against rotation relative to the clamping jaws 8 and the guide plate 9. Thus, the rotational motion of the spindle 1 and the carrier ring 2 can be transmitted to the workpiece 11 via the clamping device 4.

In order to tighten and loosen the clamping jaws 8, a mounting ring or annular support 12 is affixed to the frame of the machine tool so as to be non-rotatable. The mounting ring 12, which is provided with three slots 13 distributed about the periphery thereof and extending inward in radial direction of the mounting ring 12 and spindle 1, surrounds the carrier ring 2 with some clearance. An arresting member in the form of a rocker arm or lever 14 is disposed in each of the slots 13. Each of the rocker arms 14 is pivotally mounted on the shaft of a bolt 15 and can be pivoted between an inoperative condition and an operative condition by means of a drive cylinder 16. In the operative condition shown in the upper right-hand portion of FIG. 2, the three rocker arms 14 engage the guide plate 9 thereby centering the latter with respect to the rotational axis 3. When the rocker arms 14 are in engagement with the guide plate 9, the rocker arms 14 further function to essentially prevent rotation of the guide plate 9 and to fix the guide plate 9 against movement in axial direction of the spindle 1. To this end, the guide plate 9 has V-shaped marginal portions 17 while the rocker arms 14 have complementary V-shaped ends arranged to clamp the marginal portions 17. The rocker arms 14 are out of contact with the guide plate 9 in the inoperative conditions of the rocker arms 14.

The carrier ring 2 and/or the follower disc 5 is provided with three cutouts 18 distributed about the periphery thereof. Each of the cutouts 18 circumscribes an angle of approximately 90 degrees and the two ends of each cutout 18 define respective shoulders. In the operative condition, each of the rocker arms 14 projects into a respective cutout 18 so that, upon rotation of the carrier ring 2 and the follower disc 5, one of the shoulders of each cutout 18 will, depending on the direction of rotation, come into abutment with the corresponding rocker arm 14.

The rocker arms 14 are somewhat movable within the slots 13 in circumferential direction of the spindle 1. To this end, the bolts 15 extend generally in circumferential direction of the spindle 1 and are longitudinally shiftable through a limited distance between a rest or first position and an activating or second position. A spring or resilient member 19 urges each of the bolts 15 towards the rest position and opposes shifting thereof to the activating position.

Instead of the bolts 15 being shiftable, these may be fixed against movement while the rocker arms 14 are shiftable on the bolts 15 longitudinally of the same between the rest position and the activating position. The springs 19 then act directly on the rocker arms 14.

A switch or detecting member 20 cooperates with at least one of the bolts 15 and its rocker arm 14. The switch 20 serves as a torque limiting device which causes the rocker arms 14 to release the guide plate 9 when the torque on the rocker arms 14 and the guide plate 9 exceeds a predetermined value.

The operation is as follows:

It is assumed that the bolts 15 are in their rest positions and that the rocker arms 14 are in their operative conditions. If the spindle 1 is now driven, the carrier ring 2 compels the follower disc 5 to rotate. However, since the guide plate 9 is held by the rocker arms 14, the guide plate 9 remains stationary so that the follower disc 5 rotates relative thereto. Due to the meshing threads 7 on the follower disc 5 and the clamping jaws 8, the follower disc 5 then causes the clamping jaws 8 to shift in radial direction of the spindle 1. The design is such that the clamping jaws 8 are symmetrically displaceable relative to one another. Assuming that the follower disc 5 rotates in a sense to move the clamping jaws 8 towards the clamping position, the clamping jaws 8 are brought into engagement with the workpiece 11.

When the carrier ring 2 and follower disc 5 have undergone a predetermined angular rotation, one of the shoulders of each cutout 18 comes into abutment with the respective rocker arm 14. The shoulders engage the rocker arms 14 in such a manner as to urge the rocker arms 14, and hence the bolts 15, from the rest positions to the activating positions against the bias of the springs 19. Upon movement of the bolts 15 and rocker arms 14 to the activating positions, the switch 20 actuates the drive cylinders 16 which then pivot the rocker arms 14 from their operative conditions to their inoperative conditions thereby releasing the guide plate 9. The workpiece 11 can now be driven in rotation via the driven spindle 1, the carrier ring 2 and the clamping device 4. In the inoperative conditions, the rocker arms 14 are clear of the cutouts 18.

To release the workpiece 11, the direction of rotation of the drive for the spindle 1 is reversed and the rocker arms 14 are again pivoted towards the cutouts 18. When the ends of the cutouts 18 arrive, the guide plate 9 is held by the rocker arms 14. Continued rotation of the follower disc 5 by means of the entraining arms 6 of the carrier ring 2 then causes radially outward displacement of the clamping jaws 8, i.e., displacement of the clamping jaws 8 towards the released position, via the square threads 7.

The switch 20 together with the associated rocker arm 14, bolt 15, drive cylinder 16 and spring 19 may be considered to constitute an arresting unit for the guide plate 9.

A measuring device or means in the form of a pulse counter or pulse generator 21 is provided in the mounting ring 12 to limit the opening movement of the clamping jaws 8. The pulse counter 21 is designed to measure the displacement of the clamping jaws 8 relative to the threads on the follower disc 5 or the movement of the follower disc 5 with respect to the guide plate 9. To this end, the pulse counter 21 is arranged to cooperate with the cutouts 18 or the shoulders thereof. When the pulse counter 21 reaches a predetermined count due to passage of the cutouts 18, the pulse counter 21 stops the drive for the spindle 1 and the carrier ring 2. By stopping such drive after a predetermined number of pulses, the extent to which the clamping jaws 8 are opened can be preset so as to provide adequate space for insertion of the end 10 of a new workpiece 11 without, however, moving the clamping jaws 8 unnecessarily far in radially outward direction. When workpieces 11 of different diameter are processed in succession, the extent to which the clamping jaws 8 open can, if necessary, be preset as required by EDV control. The pulse counter 21 can also function to release the rocker arms 14, that is, to effect pivoting of the rocker arms 14 from their operative conditions to their inoperative conditions.

The entire arrangement described above can be enclosed by a cover 22 to prevent accidents.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machine tool, comprising a driven rotary member for supporting a workpiece to be treated; and means for releasably clamping the workpiece, said clamping means including a rotary clamping unit having a plurality of clamping members and guide means supporting said clamping members for relative movement between a clamping position and a released position, an actuating member for at least one of said clamping members rotatable with said rotary member, an arresting unit comprising an arresting member movable between an inoperative condition in which said arresting member is free of engagement with said clamping unit and an operative condition in which said arresting member engages a part of said clamping unit other than said at least one clamping member to thereby arrest said part of said clamping unit against rotation, and coupling means coupling said actuating member to said clamping unit, said coupling means being designed such that said actuating member can move said at least one clamping member when said arresting member is in said operative condition.

2. The machine tool of claim 1, wherein said actuating member comprises a disc which is at least approximately coaxial with said rotary member.

3. The machine tool of claim 1, wherein said at least one clamping member is movable radially of said rotary member.

4. The machine tool of claim 1, wherein said clamping members are movable symmetrically relative to one another radially of said rotary member.

5. The machine tool of claim 1, wherein said coupling means comprises meshing threads on said clamping unit and said actuating member.

6. The machine tool of claim 5, wherein said threads are square threads.

7. The machine tool of claim 1, wherein said guide means comprises a plate.

8. The machine tool of claim 1, wherein said rotary member has a rotational axis and said guide means and said actuating member are rotatable relative to one another on an axis which is at least approximately coincident with said rotational axis.

9. The machine tool of claim 1, wherein said rotary member has a first rotational axis, said guide means being mounted for radial play relative to said first axis and having a second rotational axis which is at least approximately coincident with said first axis.

10. The machine tool of claim 9, wherein said clamping means further comprises a carrier rotatable with said rotary member, said carrier having an entraining element which is connected to said actuating member and supports said guide means.

11. The machine tool of claim 10, wherein said carrier is provided with three entraining elements which are connected to said actuating member and support said guide means.

12. The machine tool of claim 10, wherein said carrier is substantially annular.

13. The machine tool of claim 1, wherein said arresting unit comprises means for operating said arresting member in response to exertion of a predetermined torque on the same.

14. The machine tool of claim 13, wherein said arresting member is shiftable in substantially tangential direction of said rotary member between a first position and a second position, said operating means including a detecting element arranged to effect movement of said arresting member to said inoperative condition when said arresting member shifts from said first to said second position.

15. The machine tool of claim 14, wherein said arresting unit further comprises a resilient member urging said arresting member towards said first position.

16. The machine tool of claim 14, wherein said arresting unit further comprises a shaft extending in substantially tangential direction of said rotary member, said arresting member being mounted on said shaft for pivotal movement between said inoperative and operative conditions.

17. The machine tool of claim 16, wherein said arresting member is fixed against movement along said shaft axially of the same and said shaft is shiftable in substantially tangential direction of said rotary member.

18. The machine tool of claim 16, wherein said shaft is fixed against axial movement and said arresting member is shiftable axially of said shaft.

19. The machine tool of claim 1, wherein said arresting member is disposed in a slot extending substantially radially of said rotary member.

20. The machine tool of claim 19, further comprising a support; and wherein said slot is provided in said support.

21. The machine tool of claim 20, wherein said support is substantially annular.

22. The machine tool of claim 1, further comprising means for measuring displacement of said one clamping member.

23. The machine tool of claim 22, wherein said measuring means comprises a pulse counter.

24. The machine tool of claim 22, wherein said coupling means comprises cooperating coupling elements on said actuating member and said at least one clamping member, said measuring means being arranged to detect movement of said one clamping member relative to the coupling element of said actuating member.

25. The machine tool of claim 22, wherein said actuating member is movable relative to said guide means when said arresting member is in said operative condition and said measuring means is arranged to detect relative movement of said guide means and said actuating member.

26. The machine tool of claim 22, wherein said measuring means is operative to arrest said rotary member, or to move said arresting member to said inoperative condition, in response to a predetermined displacement of said at least one clamping member.

27. The machine tool of claim 22, wherein said measuring means is operative to arrest said rotary member and to move said arresting member to said inoperative condition in response to a predetermined displacement of said at least one clamping member.

28. The machine tool of claim 22, wherein said measuring means comprises a counter and said actuating member is provided with a shoulder for sensing by said counter.

29. The machine tool of claim 22, wherein said measuring means comprises a counter and said clamping means further comprises a carrier rotatable with said rotary member, said carrier entraining said actuating member and supporting said guide, and said carrier being provided with a shoulder for sensing by said counter.

30. The machine tool of claim 1, further comprising a non-rotatable support; and wherein said arresting unit is fast with said support.

31. A machine tool, comprising a driven rotary member for supporting a workpiece to be treated; means for releasably clamping the workpiece, said clamping means including a rotary clamping unit having a plurality of clamping members and guide means supporting said clamping members for relative movement between a clamping position and a released position, said clamping members being movable substantially symmetrically relative to one another radially of said rotary member, and said clamping means further including an actuating member for at least one of said clamping members rotatable with said rotary member, said actuating member comprising a disc which is at least approximately coaxial with said rotary member, and said clamping means also including an arresting unit which comprises an arresting member movable between an inoperative condition and an operative condition in which said arresting member engages said clamping unit, and coupling means coupling said actuating member to said clamping unit, said coupling means including cooperating coupling elements on said actuating member and said at least one clamping member, and said coupling means being designed such that said actuating member can move said at least one clamping member when said arresting member is in said operative condition; and means for measuring displacement of said at least one clamping member, said measuring means being arranged to detect movement of said at least one clamping member relative to the coupling element of said actuating member.

* * * * *